United States Patent
Angelbeck, Jr.

[15] 3,636,888
[45] Jan. 25, 1972

[54] PALLET

[72] Inventor: John A. Angelbeck, Jr., Chesterfield, Mo.
[73] Assignee: Pack-Rite Packaging & Crating Co., Inc.
[22] Filed: May 4, 1970
[21] Appl. No.: 34,096

Related U.S. Application Data

[63] Continuation-in-part of Ser. No. 819,130, Apr. 25, 1969, Pat. No. 3,563,184.

[52] U.S. Cl. .................................................. 108/51, 108/53
[51] Int. Cl. ............................................................... B65d 19/18
[58] Field of Search ........................................... 108/51–58; 214/621, 625

[56] References Cited

UNITED STATES PATENTS

| | | | |
|---|---|---|---|
| 3,140,672 | 7/1964 | DeLuca | 108/58 X |
| 3,187,691 | 6/1965 | Leitel | 108/58 |
| 3,228,358 | 1/1966 | Sera et al. | 108/51 |
| 3,393,647 | 7/1968 | Howell | 108/52 |
| 3,424,110 | 1/1961 | Toot | 108/53 |
| 3,467,032 | 9/1969 | Rowlands | 108/51 |
| 3,563,184 | 2/1971 | Angelbeck, Jr. | 108/51 |

*Primary Examiner*—James T. McCall
*Assistant Examiner*—Glenn O. Finch
*Attorney*—Robert J. Schaap

[57] ABSTRACT

A pallet used for the storage and transporting of containers such as beer kegs and the like. The pallet is formed as a unitary plastic member in a rotational molding operation and includes a pair of spaced outer skins which are internally connected by a plurality of properly spaced webs for internal strength. The skins also have a plurality of strategically located apertures which extend through each of the skins. The pallet has a plurality of downwardly extending shoulders for engagement with containers on its underface and is also provided with supporting areas on its upwardly presented surface for removably supporting a plurality of like containers.

6 Claims, 15 Drawing Figures

PATENTED JAN 25 1972  3,636,888
SHEET 1 OF 3
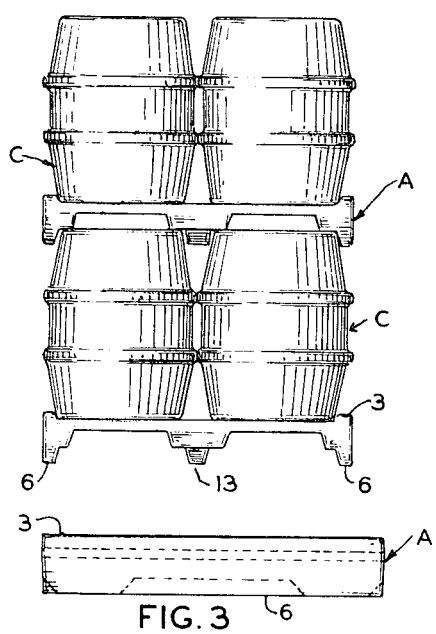
FIG. 1
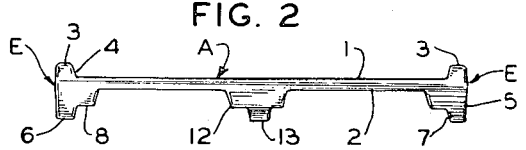
FIG. 2
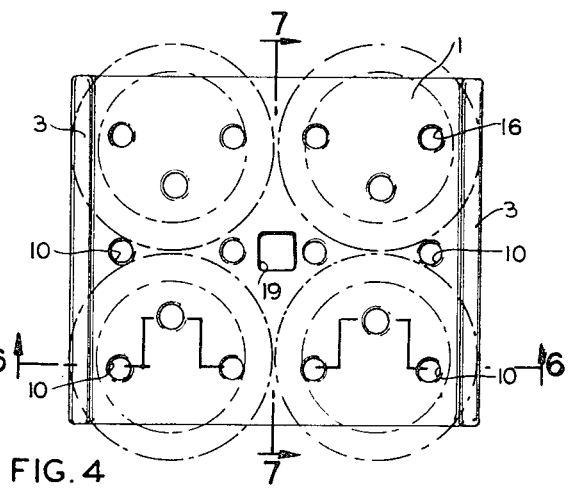
FIG. 3
FIG. 4
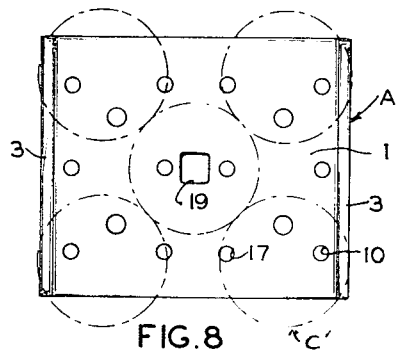
FIG. 8
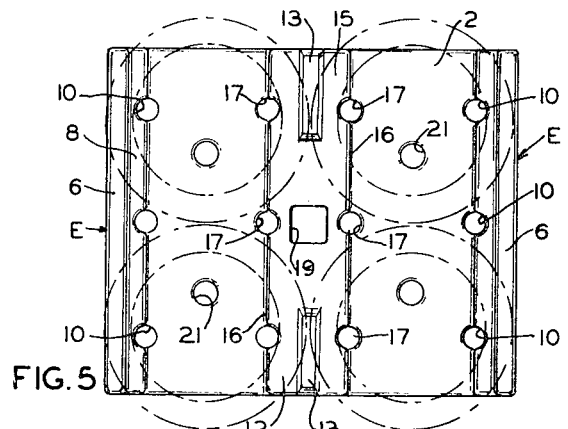
FIG. 5
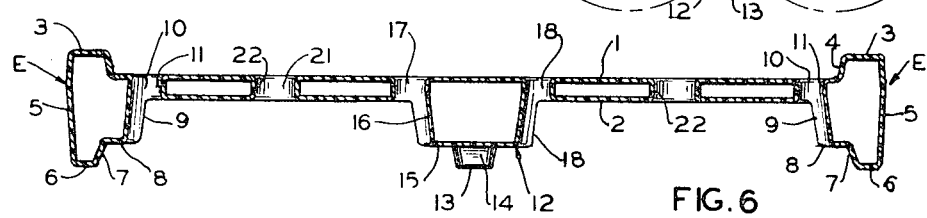
FIG. 6
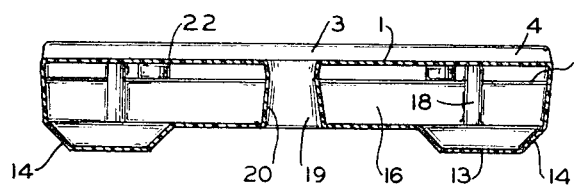
FIG. 7
INVENTOR
JOHN A. ANGELBECK, JR.
Robert J. Schaap
ATTORNEY

PATENTED JAN25 1972

INVENTOR
JOHN A. ANGELBECK, JR.

BY Robert J. Schaap

ATTORNEY

PALLET

This application is a continuation-in-part of my copending application Ser. No. 819,130, filed Apr. 25, 1969, now U.S. Pat. No. 3,563,184.

This invention relates in general to certain new and useful improvements in pallets and, more particularly, to pallets which are unitarily formed of a plastic material, for storing and transporting relatively large containers.

For many years, it has been a widespread practice to use wooden pallets for the storage and transporting of large containers such as barrels, kegs and the like. The use of pallets formed of wood has been extant to a large degree in such industries as the beer industry where considerable movement of the beer kegs is a resultant facet of manufacturing and delivery.

However, there are a number of drawbacks to the use of wooden pallets, particularly in the realm of economics and practicality. From a practical standpoint, wooden pallets are quite difficult to maintain and after a period of time, are rendered ineffective for use when subject to normal abuse in the trade. Furthermore, where the wooden pallets are used in a normally humid atmosphere or in a location where they are subject to contact with liquid substances, the wood can rapidly deteriorate. From an economic standpoint, the wooden pallets have a shorter life that pallets formed of other materials and in addition are more costly in terms of purchase price than pallets formed of nonwooden materials.

Many problems are inherent in the use of wooden pallets in a wide variety of applications. The wooden pallets are constructed by placing the frame members and cover boards in the desired locations and securing the same by means of nails or staples. However, after some use, these metal securement means are ultimately urged out of their point of securement thereby rendering the pallet defective. Vibration, which often results from carrying the pallets on a moving vehicle, causes the nails or other material fasteners to work out of their fastening positions. Furthermore, the wooden pallets have a substantially greater weight than a plastic pallet constructed of substantially equal size. Consequently, freight costs are higher when wooden pallets are employed over plastic counterpart pallets.

There are other less obvious, but nevertheless, serious disadvantages in the use of wooden pallets. The fibrous nature of wood used in the wooden pallets does not readily lend the pallets to complete sterilization, which may be desirable in many applications. In addition, a plastic pallet can be colored to the customer's specifications by incorporating a dye or other coloring agent into the plastic particles prior to the molding operation. While wooden pallets can be painted, the additional operation raises the total cost of the pallet. Furthermore, after a period of use, the paint will begin to deteriorate or wear off thereby necessitating a repainting of the pallet.

There has been a recent introduction in the marketplace of pallets formed primarily of plastic materials. However, these plastic pallets, like their wooden counterparts, also suffer from a number of disadvantages. The plastic pallets thus far available, do not have sufficient internal strength inherent in their construction to withstand the abuse normally imposed on these devices. Furthermore, the presently employed processes for producing these pallets resulted in a substantial cost which did not afford any significant economic advantage over wooden pallets.

The presently available plastic pallets also suffer one serious drawback in that they are not designed to retain any particular load-bearing item thereon in such manner that the item will not shift during transporting of the pallet. In the case of transporting beer kegs and the like, the extant pallets do not include any mechanism for holding the barrels or kegs against inadvertent spillage. If the forklift operator, or operator of similar equipment used in the transporting of the pallets, with the loads thereon, does not exercise due care, one or more of the kegs or barrels may inadvertently fall off the pallet. This inadvertent spillage not only results in economic loss from damage to the load-bearing item, but presents a hazard to personnel in the area.

It is, therefore, the primary object of the present invention to provide a pallet for the storage and transporting of large containers and similar structures, where the pallet is characterized by a unitary plastic construction.

It is another object of the invention to provide a pallet of the type stated which is selectively provided with a plurality of strategically located internal webs to afford sufficient internal strength.

It is a further object of the present invention to provide a pallet of the type stated which is relatively rigid in its construction and which is relatively inexpensive to manufacture.

It is an additional object of the present invention to provide a pallet of the type stated which is capable of effectively competing with conventional wooden pallets.

It is also an object of the present invention to provide a pallet of the type stated which is capable of being used in a wide variety of conditions and which can be used for supporting a wide variety of types and sizes of containers and other structures.

With the above and other objects in view, my invention resides in the novel features of form, construction, arrangement and combination of parts presently described and pointed out in the claims.

In the accompanying drawings (three sheets):

FIG. 1 is a front elevational view illustrating two pallets constructed in accordance with and embodying the present invention and used in stacked marginal registration with a plurality of conventional containers supported by said pallets;

FIG. 2 is a front elevational view of a pallet constructed in accordance with and embodying the present invention;

FIG. 3 is a side elevational view of the pallet of FIG. 2, the other side elevational view being substantially identical;

FIG. 4 is a top plan view of the pallet of FIG. 2;

FIG. 5 is a bottom plan view of the pallet of FIG. 2, with a plurality of container positions being represented by dotted lines therein;

FIGS. 6–7 are vertical sectional views taken along lines 6—6 and 7—7 respectively of FIG. 4;

FIG. 8 is a top plan view of a pallet constructed in accordance with and embodying the present invention and showing five smaller sized container positions in dotted lines thereon;

Figure 9:
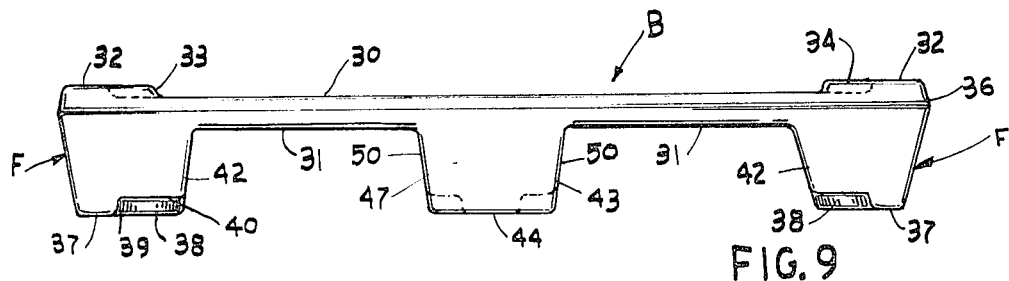
FIG. 9 is a front elevational view of a modified form of pallet constructed in accordance with and embodying the present invention.
Figure 12:
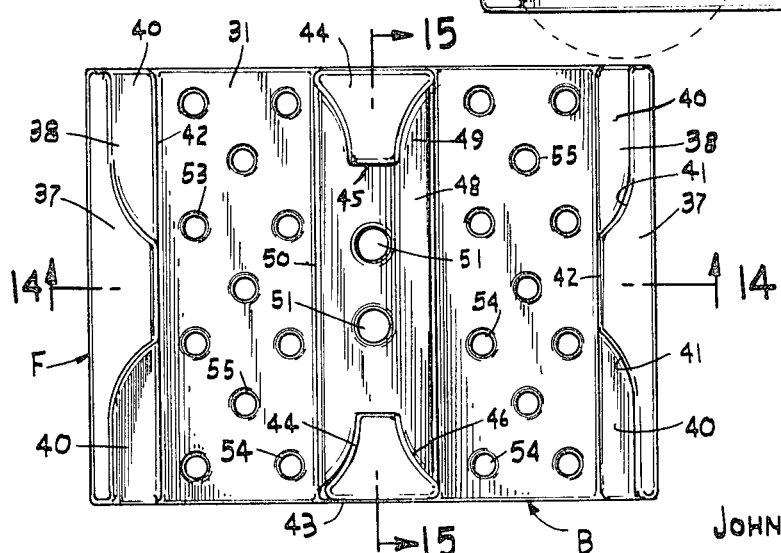
FIG. 12 is a bottom plan view of the pallet of FIG. 9.
Figure 13:
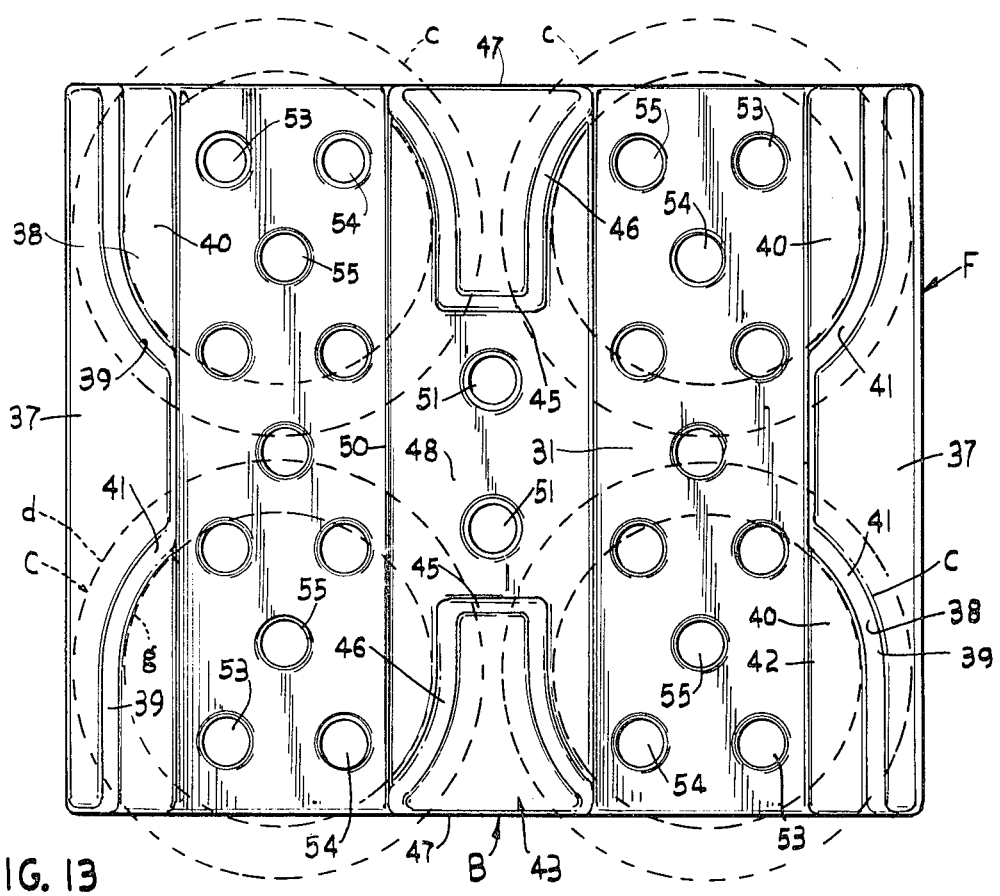
Figure 14:
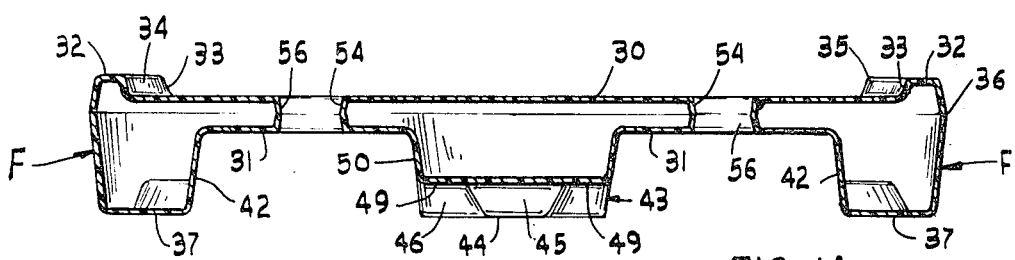
Figure 15:
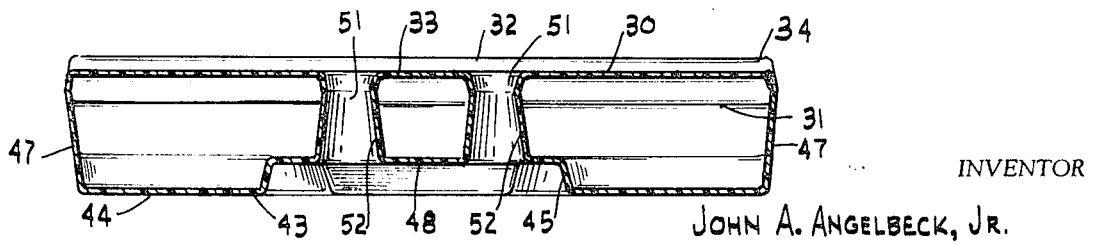

FIG. 13 is a bottom plan view of the pallet of FIG. 9 with a plurality of container positions being represented by dotted lines therein; and FIGS. 14 and 15 are vertical sectional views taken along lines 14—14 and 15—15 respectively of FIG. 12.

GENERAL DESCRIPTION

Generally speaking, the present invention relates to a pallet which is entirely formed of a plastic or synthetic resinous material in a unitary structure. The pallet has spaced top and bottom walls with enlarged transverse end sections. The end sections are provided with legs for supporting the pallet on the floor or similar supporting structure. A central support section is also provided midway between the two end sections, the central section also containing legs for engagement with the floor or similar supporting structure. In addition, the end sections and the central section have downwardly presented load-bearing shoulders for receiving the upper margins of containers disposed on a similar pallet therebeneath. The pallet is provided with strategically located apertures formed by webs which provide internal strength and rigidity.

A modified form of pallet is provided in which the top wall is integrally formed with a pair of spaced laterally extending upstanding retaining flanges. The flanges are provided with curved terminal sections to engage the lower margins of barrels or kegs which are disposed on the top wall in supportive position. In this manner, a plurality of barrels can be supported on the top wall in such manner that the barrels are positionally retained against lateral or longitudinal shifting. The bottom wall is also provided with arcuately shaped retaining walls on both the end sections and the central support section which aids in rigidly retaining in position barrels which are disposed on a pallet immediately therebeneath.

DETAILED DESCRIPTION

Referring now in 1 detail and by reference characters to the drawings which illustrate a preferred embodiment of the present invention, A designates a pallet which is formed of unitary construction from a suitable plastic or synthetic resin material such as high-density polyethylene. It has been found in connection with the present invention that rotational molding is one of the most effective molding techniques used in the formation of the pallets. While high-density polyethylene has been found to be one of the most suitable materials used in the formation of the pallets, the invention is by no means limited to this particular material. Other materials which can be used in the formation of the pallets are polyvinyl chloride, polystyrene, polystyrene-butadiene copolymers, a number of other polyvinyl halide polymers and a number of acrylate and methacrylate copolymers, etc.

The resin chosen for use in the manufacture of the pallet would normally depend upon the particular desired end use of the pallet. Strong consideration is given to the density and melt index of the resin to be selected inasmuch as these parameters will influence properties such as softening temperature, stiffness, environmental stress cracking resistance and impact strength. A higher softening temperature is desirable in applications which may require sterilization of the pallet or high-temperature use. A high rigidity factor is desirable where the pallets are constructed with a thin wall for economic reasons or where good dimensional stability is important.

In many cases, it may be desirable to add stabilizers so that the resin used in the formation of the pallet is properly protected from both thermal and ultraviolet light degradation. These additives are conventionally well known and the particular additive and the amount used will depend on the service and color requirements of the pallet. It may also be desirable to add a pigment or other coloring agent to the plastic pellets used in the formation of the pallet, in order to render the desired color to the pallet. Again, the coloring agents which would be employed are well known in the plastics industry. Some of the conventional well-known coloring agents are isoindolinone, dianisidine, anthrapyrimidine phthalocyanine, carbon black, titanium dioxide, etc.

The pallet A is formed as an integral unit with a pair of essentially opposed and spaced sheets or so-called "skins" as illustrated in FIGS. 6 and 7. The pallet A generally comprises a relatively flat top wall 1 and spaced downwardly therefrom is an opposed relatively flat bottom wall 2. Integrally formed with the top wall 1 and bottom wall 2 are end sections H which extend along the transverse ends of the top and bottom walls 1,2. The end sections E comprise a pair of transverse upwardly extending rectangular shoulders 3 which are integrally formed with the top wall 1 and have inwardly presented vertical abutment surfaces 4. Each of the shoulders 3 integrally merges into outwardly presented end walls 5 which in turn, merge into downwardly presented transversely extending base walls 6. Inwardly and upwardly extending inclined walls 7 are integrally formed with the base walls 6 and with downwardly presented load-bearing shoulders 8. The load-bearing shoulders 8 are, in turn, connected to the bottom wall 2 by means of inwardly facing flat vertical walls 9.

It should be recognized that the end sections E serve as load-bearing elements and are, therefore, formed with substantial thickness. The base walls 6 are designed to support the pallet A when placed directly on a floor or other supporting structure. Furthermore, the load-bearing shoulders 8 are designed to engage one or more barrels or similar containers C when the pallets are used in stacked relationship.

The pallet A is provided with three transversely aligned apertures 10 which are spaced inwardly from one of the abutment surfaces 4. In like manner, three transversely aligned apertures 10 are also located inwardly of the opposite abutment surface 4. The apertures 10 extend through the top and bottom walls 1,2 and through portions of the load-bearing shoulders 8 and the flat walls 9. Each of the apertures 10 is surrounded and formed by circular webs 11 which extend between the two skins. Thus, by reference to FIG. 6, it can be seen that the webs 11 extend between the top and bottom walls 1,2 and between the top wall 1 and load-bearing shoulders 8, as well as the flat walls 9.

Integrally formed with the bottom wall 2 somewhat centrally thereof, and extending downwardly therefrom is a transversely extending center support 12, which is more fully illustrated in FIGS. 1, 2, and 5. The center support 12 is integrally provided with a pair of downwardly extending transverse support ribs 13 which extend inwardly from the forward and rearward margins of the bottom wall 2. By further reference to FIG. 7, it can be seen that the support ribs 13 each extend inwardly for a distance approximately one-fourth of the overall transverse dimension of the bottom wall 2. Furthermore, the support ribs 13 each have forward and rearward tapered end walls 14 which are inclined at about a 45° angle.

The center support 12 is also provided with spaced load-bearing shoulders 15 on each side of the support ribs 13 and extend for substantially the entire transverse distance of the bottom wall 2. The shoulders 15 are integrally formed with outwardly facing vertical walls 16 which, in turn, merge into the bottom wall 2. It should be observed that the vertical walls 9 and 16 are slightly inclined inwardly at about a 10° angle of taper.

The pallet A is provided with two pairs of transversely aligned apertures 17 which are located along the transverse margins of the center support 12 so that the apertures extend through the top and bottom walls 1,2, the flat vertical walls 16 and the load bearing shoulders 15. Each of the apertures 17 is surrounded by and formed by circular webs 18 which extend between the top and bottom walls 1,2 and between the bottom walls 2, the shoulders 15 and vertical walls 16. It should be observed that the portion of the apertures 17 extending through the walls 16 and the load-bearing shoulders 15 are diametrally larger than the portion of the apertures 17 extending through the top and bottom walls 1,2. Furthermore, the webs 18 which form the apertures 17 have slightly inclined walls with a downwardly and outwardly presented taper.

The pallet A is also provided with a large central aperture 19 which extends through the top and bottom walls 1,2 and through the lower wall of the center support 12. The portion of the aperture 19 extending through the center support 12 is substantially larger than the portion of the aperture 19 extending through the top and bottom walls 1,2. The aperture 19 is also formed by and surrounded by a circular web 20. The portion of the web 20 located in the region of the center support has downwardly and outwardly inclined walls with an angle of taper of approximately 10°.

Spaced approximately midway between the transversely extending rows of apertures 10 and 17 on each side of a transverse centerline of the pallet A are additional rows of two transversely aligned apertures 21. The apertures 21 extend through the top and bottom walls 1,2 and are surrounded by and formed by circular webs 22.

Each of the aforementioned apertures in the pallet A have rounded corners where they are formed in the various components. Furthermore, the various apertures are so located in strategic positions so that containers supported on the pallet A contact load-bearing surfaces of the pallet A which are reinforced by the various webs. In essence, the various webs extending through the two skins form a type of honeycomb structure providing sufficient internal strength and rigidity. By reference to FIG. 1, it can be seen that the pallets can be used in a stacked structure arrangement to support a number of levels or tiers of containers C. Four such containers can be placed on the top wall 1 in substantially the location illustrated in FIG. 4. The lower pallet A would be located on the floor or other supporting structure and would rest on the base walls 6 and the support ribs 13.

Other pallets A supporting containers C can be stacked on similar containers C supported on a like pallet A disposed beneath and in marginal registration with the first-named pallet A. A second pallet A can be disposed above and in supportive engagement with the containers C on the lower pallet A. The upper pallet A supporting containers C would bear against the load-bearing shoulders 8 and 15 of the upper pallet A. Furthermore, it should be observed that the apertures and webs located in these shoulders are so located that the portions of the pallet absorbing the stress imposed have sufficient internal strength and rigidity.

This type of supporting arrangement enables the skids of a forklift truck or similar vehicle (not shown) to be engageable with the underside of the bottom wall 2 of a pallet A without disturbing the containers C on the pallet A therebeneath. It can be observed that there is sufficient clearance between the upper margins of the containers which engage the load-bearing shoulders 8, 15 of a pallet A disposed thereabove and the underside of the bottom wall 2 of this pallet A.

FIG. 8 illustrates an arrangement where five containers C' can be supported on the top wall 1 of a pallet A. The containers C' have a smaller diametrical size than the containers C and five of these containers C' can be conveniently supported on the top wall 1 whereas four of the larger containers C can be supported on the top wall 1. It is to be noted that the pallets could be used in a stacking arrangement with the containers C' in the same manner as with the containers C. Where the five containers C' are located in the positions substantially as illustrated in FIG. 8, the upper margins of these containers would engage the load-bearing shoulders 8,15 of a pallet disposed immediately thereabove. The upper margins of the four containers C' located along the periphery of the pallet A would engage both the load-bearing shoulders 8 and 15 of a pallet disposed immediately thereabove. However, the container C' located on the center of the top wall 1 would engage both of the opposed load-bearing shoulders 15 of the pallet A disposed immediately thereabove.

It is also possible to provide a pallet B in accordance with the present invention and which is more fully illustrated in FIGS. 9–15. The pallet B is constructed from the same materials as the pallet A and is generally formed by the same method of manufacture, such as by rotational molding. Furthermore, the pallet B is formed as an integral unit with a pair of essentially opposed and spaced sheets or skins in the same manner as the pallet A. In like manner, the pallet B lends itself to the same versatility as the pallet A.

The pallet B generally comprises a relatively flat top wall 30 and spaced downwardly therefrom is an opposed relatively flat bottom wall 31. Integrally formed with the top wall 30 and bottom wall 31 are end sections F which extend along the transverse ends of the top and bottom walls 30, 31. The end sections E comprise a pair of transverse upwardly extending rectangular retaining flanges 32 which are integrally formed with the top wall 30 and have inwardly presented vertical abutment surfaces 33.

The flanges 32 are provided with enlarged terminal sections 34 along the forward and rearward margins of the top wall 30. The terminal sections 34 integrally include are arcuately shaped inwardly presented walls 35. By reference to FIG. 13, it can be seen that containers C disposed on the wall 30 have a large central diameter $d$ in the vertical dimension and smaller upper and lower periphery diameters $g$ in the vertical dimension. Furthermore, the walls 35 are formed with a radius which conforms to the radius of the upper and lower margins with diameter $g$ so that the walls 35 snugly engage the lower margins of the containers C disposed on the top wall 30.

Each of the retaining flanges 33 integrally merge into outwardly presented end walls 36 which, in turn, merge into downwardly presented transversely extending base walls 37. The base walls 37 are cut away in the provision of somewhat arcuately shaped barrel-receiving recesses 38. The barrel-receiving recesses 38 are defined by inwardly and upwardly extending inclined walls 39 which are integrally formed with the base walls 37 and which also integrally merge into relatively flat downwardly presented load-bearing shoulders 40. By reference to FIG. 12, it can be seen that the inclined walls 39 extend from the forward and rearward margins of the pallet B and terminate somewhat near the longitudinal centerline of the pallet B in arcuately shaped terminal sections 41. The load-bearing shoulders 40 and the portion of the bottom walls 37 which are not cut away in the provision of the recesses are integrally connected to the bottom wall 31 by means of inwardly facing flat vertical walls 42.

Figure 10:
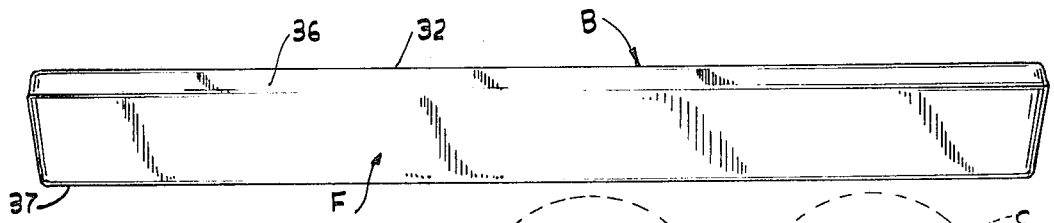
FIG. 10 is a side elevational view of the pallet of FIG. 9, the other side elevational view being substantially identical.
Figure 11:
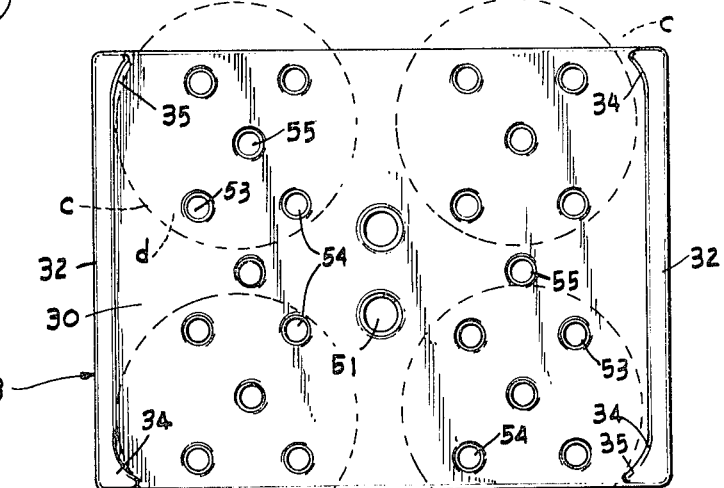
FIG. 11 is a top plan view of the pallet of FIG. 9.

By reference to FIGS. 9 and 10, it can be seen that the terminal sections 41 forming part of the walls 39 are provided with a radius which is equivalent to the radius of the upper margin of the container C. Accordingly, when the pallet B is disposed on and supported by a plurality of properly located containers C, the upper margins of the containers C will engage the arcuate terminal sections 41 and will, in essence, positionally locate the pallet B. Furthermore, when a pallet B in a stack of pallets has a load thereon and is supported by a plurality of containers C on a like pallet, each of the stacked pallets will be somewhat locked in marginal registration. The weight of the containers C on the pallet B will provide a downwardly directed force and the containers C disposed beneath the pallet B will engage both the arcuate terminal sections 41 and a portion of the inclined walls 39 and thereby prevent lateral or longitudinal shifting of the pallet B. Thus, it can be seen that the pallet B is essentially locked into position in marginal registration with other pallets B when the pallets are used with load-bearing structures in stacked relationship.

It should also be recognized that the end sections F serve as load-bearing elements and are, therefore, formed with substantial thickness. The base walls 37 are designed to support the pallet B when placed directly on a floor or other supporting structure. Furthermore, the load-bearing shoulders 40 are designed to engage the upper margins of the containers C when the pallets are used in stacked relationship in the manner as previously described.

Integrally formed with the bottom wall 31 somewhat centrally thereof, and extending downwardly therefrom, is a transversely extending center support 43, which is essentially a rectangular horizontal cross section and which is more fully illustrated in FIGS. 9, 10 and 12. The center support 43 is integrally provided with a pair of downwardly extending transverse floor engageable support ribs 44 which extend inwardly from the forward and rearward margins of the bottom wall 31. By further reference to FIG. 12, it can be seen that the support ribs 44 each extend inwardly for a distance approximately one-fourth of the overall transverse dimension of the bottom wall 31.

The support ribs 44 each have an overall shape as illustrated in FIG. 12 and have tapered inwardly presented end walls 45 which are inclined at about a 45° angle. The end walls 45 integrally merge into a pair of oppositely spaced arcuately shaped guide walls 46, and which, in turn, merge into outwardly presented end walls 47, in the manner as illustrated in FIGS. 9 and 12. The center support 43 is also provided with a relatively flat downwardly presented surface 48, and the portion of the downwardly presented surface 48, which lies between the arcuately shaped guide walls 46 and the transverse margins of the surface 48, serves as load-bearing shoulders 49. Finally, the downwardly presented surface 48 is integrally connected to the bottom wall 41 through outwardly facing vertical walls 50. It should be observed that the vertical walls 50 are slightly inclined at about a 10° angle of taper.

By further reference to FIG. 12, it can be seen that the load-bearing shoulders 49 cooperate with the oppositely disposed load-bearing shoulders 40 to receive the upper peripheral margin of a container C. Furthermore, the arcuately shaped guide walls 46 are properly spaced from and are formed with the same radius as the opposed and cooperating arcuately shaped terminal sections 41. Moreover, the overall diameter of a circle formed by these arcuately shaped guide walls 46 and arcuately shaped terminal sections 41 is approximately equal to the overall diameter of the upper peripheral margins of the containers C.

Thus, it can be seen that the upper margin of a container C will be in engagement with the load-bearing shoulders 40, 49 and with the terminal sections 41 and guide walls 46. Accordingly, a container C is snugly disposed in the recess formed by the guide wall 46 and terminal section 41 and thereby prevents either lateral or longitudinal shifting movement of a pallet B disposed on the container C.

The pallet B is provided with a pair of transversely aligned large central apertures 51 which extends through the top wall 30 and through the downwardly presented surface 48 of the center support 43. The apertures 51 extending through the center support 43 are substantially diametrically larger than the apertures (hereinafter described) extending through the top and bottom walls 30,31. The apertures 51 are also formed by and surrounded by circular webs 52 which extend between and are integrally formed with the top and bottom walls 30,31. The webs 52 located in the center support 43 having downwardly and outwardly inclined walls with an angle of taper of approximately 10°.

The pallet B is also provided with a row of four transversely aligned and spaced apertures 53 in close proximity to each of the relatively flat vertical walls 42. In like manner, the pallet B is also provided with a row of four transversely aligned and spaced apertures 54 in close proximity to each of the relatively flat vertical walls 50. Finally, rows of three transversely aligned and spaced apertures 55 are located midway between each of the rows of apertures 53,54, in the manner as illustrated in FIG. 12. The apertures in the row of apertures 55 are located so that they are approximately midway between two transversely spaced apertures 53 in the row of apertures proximate the vertical walls 42. Thus, apertures in the row of apertures 53 are transversely aligned, apertures in the row of apertures 55 are transversely aligned and corresponding apertures in the rows 53,55 are longitudinally aligned.

The apertures in the rows 53, 54, and 55 extend through the top and bottom walls 30,31. Each of the apertures in the rows 53, 54, and 55 are surrounded by and formed by circular webs 56 which extend between the two skins. Thus, by reference to FIG. 14, it can be seen that the webs 56 which form the apertures in the rows 53, 54, and 55 have slightly inclined walls with a downwardly and inwardly inclined taper extending from the top wall 30 and an upwardly and inwardly inclined taper extending from the bottom wall 31. Thus, it can be seen that the overall diameter of the apertures in the rows 53, 54, and 55 is less at the vertical midpoint of the apertures than at the upper and lower margin of the apertures.

Each of the aforementioned apertures in the pallet B have rounded corners where they are formed in the various components. Furthermore, the various apertures are so located in strategic positions so that areas between the end sections and the central support 43 and which areas support containers C of the pallet B are reinforced by the various webs. In essence, the various webs extending through the two skins form a type of honeycomb structure providing sufficient internal strength and rigidity. By reference to FIG. 1, it can be seen that the pallets B as well as the pallets A can be used in a stacked structure arrangement to support a number of levels or tiers of containers C. Four such containers can be placed on the top wall 30 in substantially the location illustrated in FIG. 13. The lower pallet B would be located on the floor of other supporting structure and would rest on the base walls 37 and the support ribs 44.

Other pallets B supporting containers C can be stacked on similar containers C supported on a like pallet B disposed beneath and in marginal registration with the first-named pallet B. A second pallet B can be disposed above and in supportive engagement with the containers C on the lower pallet B. The upper margins of the containers C would bear against the load-bearing shoulders 40 and 49 of the upper pallet B. Furthermore, it should be observed that the apertures and webs located in these shoulders are so located that the portions of the pallet absorbing the stress imposed have sufficient internal strength and rigidity.

This type of supporting arrangement enables the skids of a forklift truck or similar vehicle (now shown) to be engageable with the underside of the bottom wall 31 of a pallet B without disturbing the containers C on the pallet A thereunder. It can be observed that there is also sufficient clearance between the upper margins of the containers which engage the load-bearing shoulders 40,49 of a pallet B disposed thereabove and the underside of the bottom wall 31 of this pallet B.

While the pallets A and B of the present invention have been illustrated for use with a plurality of barrel-type containers, it should be recognized that the pallets A or B could be used with containers having different sizes and shapes, as well as with other types of load-bearing structures.

It should be understood that changes and modifications in the form, construction, arrangement and combination of parts presently described and pointed out may be made and substituted for those herein shown without departing from the nature and principle of my invention.

Having thus described my invention, what I desire to claim and secure by Letters Patent is:

1. A double-skinned pallet formed from plastics material for supporting load-bearing structures having protruding margins, said pallet comprising:
   a. an upper wall;
   b. a lower wall;
   c. at least one web extending between said walls and being integrally formed with each of said walls and providing an aperture within said pallet;
   d. said web being somewhat cylindrical in shape so as to provide internal strength and to maintain spacial relation between said two walls;
   e. a peripheral wall extending around the extreme peripheries of the upper and lower walls to support said peripheries;
   f. said peripheral wall being integrally formed with the upper and lower walls; and
   g. a pair of upstanding retaining flanges on said upper wall;
   h. said retaining flanges having portions which are sized and shaped to conform to portions of said protruding margins for engaging said portions of said margins.

2. A double-skinned pallet formed from plastics material for supporting load-bearing structures having protruding margins and being disposed in supportive position over such type of load-bearing structures, said pallet comprising:
   a. an upper wall;
   b. a lower wall;
   c. at least one web extending between said walls and being integrally formed with each of said walls providing an aperture within said pallet;
   d. said web being somewhat cylindrical in shape so as to provide internal strength and to maintain spacial relation between said two walls;
   e. a peripheral wall extending around the extreme peripheries of the upper and lower walls to support said peripheries;
   f. said peripheral wall being integrally formed with the upper and lower walls; and
   g. cooperating load-bearing shoulders on the underside of said lower wall;
   h. said load-bearing shoulders having wall portions which are sized and shaped to conform to portions of said protruding margins for engaging said portions of said margins to thereby retain said portions of said margins to thereby retain said pallet on said load bearing structures.

3. The pallet of claim 2 further characterized in that said pallet comprises a pair of upstanding retaining flanges on said upper wall, said retaining flanges having portions which are sized and shaped to conform to portions of said protruding margins for engaging portions of said margins.

4. A load-carrying pallet formed substantially of a plastic material as a substantially integral member and comprising a first surface for receiving load-bearing structures thereon, a second surface disposed beneath said first surface, first and second enlarged sections extending between and connecting said first and second surfaces, said enlarged sections being located in proximate relation to at least one margin of said surfaces, an enlarged intermediate section located approximately midway between said first and second sections and connecting said first and second surfaces, at least one weblike element extending between said first and second surfaces, load-bearing shoulders on said first and second sections, load-bearing shoulders on said intermediate section and cooperating with the load-bearing shoulders on said first and second sections, said load-bearing shoulders having a size and shape to conform to portions of engageable margins on said load-bearing structures and support the load of said pallet when the pallet is disposed on such load-bearing structures.

5. A load-carrying pallet formed substantially of a plastic material as a substantially integral structure for receiving load-bearing structures thereon where said structures have upper and lower arcuately shaped margins, a second surface disposed beneath said first surface, first and second enlarged sections extending between and connecting said first and second surfaces and being located in proximate relation to at least one margin of said surfaces, an intermediate section located between said first and second sections, floor-engageable elements on said first and second sections, at least one weblike element extending between said first and second surfaces to integrally join said first and second sections, load-bearing shoulders formed with said first and second sections, cooperating load-bearing shoulders formed with said intermediate section and cooperating with the load-bearing shoulders on said first and second sections, each of said load-bearing shoulders having arcuately shaped walls to match the upper arcuately shaped margins of said load-bearing structures, and a pair of upstanding retaining flanges on said first and second enlarged sections and extending upwardly of said first surface, sand flanges having arcuately shaped walls to match the arcuately shaped margins of said load-bearing structures and thereby retain said load-bearing structures on said first surface.

6. A load-carrying pallet formed substantially of a plastic material as a substantially integral structure and comprising a first surface adapted for receiving load-bearing structures having engageable margins thereon, a second surface disposed beneath said first surface, first and second enlarged sections extending between and connecting said first and second surfaces, and enlarged sections being located in proximate relation to at least one margin of said surfaces, an intermediate section located between said first and second sections, floor-engageable elements on said first and second sections, load-bearing shoulders on said first and second sections, cooperating load-bearing shoulders operatively associated with said intermediate section and cooperating with the load-bearing shoulders associated with said first and second sections, said load-bearing shoulders having a size and shape to receive portions of said load-bearing structures, and at least one somewhat cylindrical weblike element extending between said first and second surfaces and being integrally formed with said first and second surfaces to integrally join said first and second sections, said weblike element forming an aperture extending between said first and second surfaces.

* * * * *

UNITED STATES PATENT OFFICE
CERTIFICATE OF CORRECTION

Patent No. 3,636,888       Dated January 25, 1972

Inventor(s) John A. Angelbeck, Jr.

It is certified that error appears in the above-identified patent and that said Letters Patent are hereby corrected as shown below:

Column 1, line 25 delete "that" and insert therefor ---than---;

Column 5, line 30, delete "diametrical" and insert therefor ---diametral---;

Column 5, line 61, delete "E" and insert therefor ---F---;

Column 5, line 67, delete "are";

Column 6, line 49, delete "a";

Column 6, line 49, after "horizontal" insert therefor ---in---;

Column 7, line 62, delete "of" and insert therefor ---on---;

Column 8, line 11, delete "now" and insert therefor ---not---;

Claim 1, Column 8, lines 74 and 75 delete "portions of said margins to thereby retain said";

Claim 5, Column 10, line 9 delete "sand" and insert therefor ---said---.

Signed and sealed this 26th day of December 1972.

(SEAL)
Attest:

EDWARD M. FLETCHER, JR.          ROBERT GOTTSCHALK
Attesting Officer                Commissioner of Patents